(12) United States Patent
Petras

(10) Patent No.: US 7,899,619 B2
(45) Date of Patent: Mar. 1, 2011

(54) APPARATUS AND METHOD FOR TRANSMITTING INFORMATION USING AN IRIG-B WAVEFORM GENERATED BY AN INTELLIGENT ELECTRONIC DEVICE

(75) Inventor: Charles E. Petras, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 1118 days.

(21) Appl. No.: 11/583,474

(22) Filed: Oct. 18, 2006

(65) Prior Publication Data
US 2008/0097694 A1    Apr. 24, 2008

(51) Int. Cl.
G01S 19/14 (2010.01)
G01S 19/00 (2010.01)
G01R 31/00 (2006.01)
G01R 31/08 (2006.01)

(52) U.S. Cl. ......................... 701/213; 700/286
(58) Field of Classification Search .................. 324/72, 324/512, 522; 701/213
See application file for complete search history.

(56) References Cited

U.S. PATENT DOCUMENTS

| | | | |
|---|---|---|---|
| 5,793,869 A | 8/1998 | Claflin | |
| 6,564,146 B1* | 5/2003 | Meyer et al. | 701/213 |
| 6,662,124 B2 | 12/2003 | Schweitzer | |
| 6,678,134 B2 | 1/2004 | Sugiura et al. | |
| 6,754,210 B1 | 6/2004 | Ofek | |
| 2001/0023464 A1* | 9/2001 | Deck et al. | 710/105 |
| 2002/0178258 A1* | 11/2002 | Hushing et al. | 709/224 |
| 2003/0218540 A1* | 11/2003 | Cooper et al. | 340/539.26 |
| 2005/0041767 A1* | 2/2005 | Whitehead et al. | 375/376 |
| 2008/0077336 A1* | 3/2008 | Fernandes | 702/57 |

OTHER PUBLICATIONS

"GPS PCI/PCI-X Slot Card GPS169PCI". Meinberg Funkuhren. Sep. 18, 2005. <www.meinberg.de/english/products/gps169pci.htm>. Internet Archive: Jul. 12, 2010; <http://web.archive.org/web/20050918082155/www.meinberg.de/english/products/gps169pci.htm>.*
"English manual (gps169pci)". Meinberg Funkuhren. Jul. 12, 2010. 34 pages. <http://www.meinberg.de/download/docs/manuals/english/gps169pci.pdf>.*
"English info sheet (gps169pci)". Meinberg Funkuhren. Jul. 12, 2010. 3 pages. <http://www.meinberg.de/download/docs/shortinfo/english/info_gps169pci.pdf>.*
Chen, E., Timorabadi, H. S., and Dawson, F. P. "Real-time phasor measurement method including a GPS common time-stamp for distributed power system monitoring and control," in Canadian Conference on Electrical and Computer Engineering, 2005, pp. 441-444.*
Hart, D.G., Uly, D., Gharpure, V., Navosel, D., Karlsson, D., and Kaba, M.: 'PMUs: a new approach to power network monitoring', ABB Review, 2001, pp. 58-61.*
US Army RCC, IRIG Serial Time Cose Formats, IRIG Standard 200-98, May 1998.
IEEE, IEEE Standard for Synchrophasors for Power Systems, IEEE Std 1244-1995, May 27, 1996.

(Continued)

Primary Examiner — Khoi Tran
Assistant Examiner — Dale Moyer
(74) Attorney, Agent, or Firm — Eugene M. Cummings, P.C.

(57) ABSTRACT

An intelligent electronic device broadcasts its own location information over an IRIG-B or similar network, avoiding the need for maintenance personnel to manually record the location of the installed device, and avoiding errors in tracking its location. The intelligent electronic device either is equipped with a GPS module, or receives location information from another device installed at the same site.

6 Claims, 10 Drawing Sheets

OTHER PUBLICATIONS

Timing Committee/Range Commanders Council, IRIG Serial Time Code Formats, Sep. 2004, Range Commanders Councils, New Mexico.

Brandywide Communications, User Guide GPS Time and Frequency System, Model GPS8 Plus, Oct. 2004, Brandywine Communications, Santa Ana, California.

Schweitzer Engineering Laboratories, Inc., SEL-2407 GPS Clock Instruction Manual, Mar. 11, 2005.

* cited by examiner

| TIME | FRAME C25 | DATA C26 | PARITY C27 | DESCRIPTION |
|---|---|---|---|---|
| 0 | 0 | 0 | 0 | no message |
| 1 | 1 | 0 | 0 | ASCII 'H' = 0x48 hex |
| 2 | 1 | 1 | 1 | or "01001000" binary |
| 3 | 1 | 0 | 0 | |
| 4 | 1 | 0 | 0 | |
| 5 | 1 | 1 | 1 | |
| 6 | 1 | 0 | 0 | |
| 7 | 1 | 0 | 0 | |
| 8 | 1 | 0 | 0 | |
| 9 | 1 | 0 | 0 | ASCII 'E' = 0x45 hex |
| 10 | 1 | 1 | 1 | or "01000101" binary |
| 11 | 1 | 0 | 0 | |
| 12 | 1 | 0 | 0 | |
| 13 | 1 | 0 | 0 | |
| 14 | 1 | 1 | 1 | |
| 15 | 1 | 0 | 0 | |
| 16 | 1 | 1 | 1 | |
| 17 | 1 | 0 | 0 | ASCII 'L' = 0x4C hex |
| 18 | 1 | 1 | 0 | or "01001100" binary |
| 19 | 1 | 0 | 0 | |
| 20 | 1 | 0 | 0 | |
| 21 | 1 | 1 | 1 | |
| 22 | 1 | 1 | 1 | |
| 23 | 1 | 0 | 0 | |
| 24 | 1 | 0 | 0 | |
| 25 | 1 | 0 | 0 | ASCII 'L' = 0x4C hex |
| 26 | 1 | 1 | 1 | or "01001100" binary |
| 27 | 1 | 0 | 0 | |
| 28 | 1 | 0 | 0 | |
| 29 | 1 | 1 | 1 | |
| 30 | 1 | 1 | 1 | |
| 31 | 1 | 0 | 0 | |
| 32 | 1 | 0 | 0 | |
| 33 | 1 | 0 | 0 | ASCII 'O' = 0x4F hex |
| 34 | 1 | 1 | 1 | or "01001111" binary |
| 35 | 1 | 0 | 0 | |
| 36 | 1 | 0 | 0 | |
| 37 | 1 | 1 | 1 | |
| 38 | 1 | 1 | 1 | |
| 39 | 1 | 1 | 1 | |
| 40 | 1 | 1 | 1 | |
| 41 | 1 | 0 | 0 | ASCII 'W' = 0x57 hex |
| 42 | 1 | 1 | 1 | or "01010111" binary |
| 43 | 1 | 0 | 0 | |
| 44 | 1 | 1 | 1 | |
| 45 | 1 | 0 | 0 | |
| 46 | 1 | 1 | 1 | |
| 47 | 1 | 1 | 1 | |
| 48 | 1 | 1 | 1 | |
| 49 | 0 | 0 | 0 | no message |
| 50 | 0 | 0 | 0 | no message |
| 51 | 0 | 0 | 0 | no message |
| 52 | 0 | 0 | 0 | no message |

Sending the string "HELLO" using the encoding scheme.

| Field | Description | Format (ASCII) |
|---|---|---|
| 1 | IED ID (16-bit value) | NNNN/* |
| 2 | Account ID | <string>/** |
| 3 | Old Password | <string>/** |
| 4 | New Password | <string>/** |
| 5 | Start Time (32-bit value) | TTTTTTTT/* /*** |

Note /* - Represented as a hex ASCII string.
Note /** - Variable length ASCII character string encoded using FIPS 180-1 Secure Hash Algorithm (SHA-1).
Note /*** - Time when the new password will become effective (value is the UNIX epoch second of century in UTC).

FIG. 6

APPARATUS AND METHOD FOR TRANSMITTING INFORMATION USING AN IRIG-B WAVEFORM GENERATED BY AN INTELLIGENT ELECTRONIC DEVICE

CROSS-REFERENCE TO RELATED APPLICATIONS

None

FIELD OF THE INVENTION

The present invention relates generally to apparatus, systems, and methods for communication between intelligent electronic devices, and more specifically, to apparatus, systems, and methods for transmitting information using an IRIG-B waveform (Inter Range Instrument Group time code standard) generated by an intelligent electronic device.

DESCRIPTION OF THE PRIOR ART

The use of networked electronic equipment has become pervasive in modern society. Some main uses of networked electronic equipment are power systems and communication systems, such as the land based telephone system and various wireless networks. In all of these cases, numerous pieces of electronic equipment are installed in physically disparate locations and linked together to accomplish a common purpose. Similarly, in all of these cases, there is a common need among owner-operators of the networked equipment to manage the equipment. One component of managing the networked equipment is keeping track of installations and maintenance, and knowing the precise position of installed equipment is vital to both of these tasks.

Often, position information for networked electronic equipment is maintained by an operator manually entering location information into a networked database. This is so despite the fact that many networked electronic devices now contain GPS circuitry able to translate GPS data into sufficiently precise location information, or are deployed at a location where location information is available in digital format from another source. This information is not used to automatically track the location of installed devices for a number of reasons; for instance, many networked electronic devices are not connected to a convenient communications network for communicating the location information, and GPS derived location information may not be in a form convenient for the use of the particular owner-operator's information systems.

While the networked electronic devices may not be connected to IP networks, or other standard communications networks, they often are connected to limited networks used to synchronize time references among the different devices. A common time reference may be important for any electronic device which uses time-stamped events for decision making. Numerous mechanisms for distributing a reference time to a group of networked devices have been developed; for instance, the popular Network Time Protocol (NTP) is used to distribute precise time references to many networked computers via the Internet.

One form of limited network used to distribute a common time reference is IRIG. IRIG Standard 200-04 is a standardized time code developed by the United States Range Commanders Council. IRIG is usually used to distribute a GPS derived reference time to non-GPS enabled devices, thereby establishing a synchronized time reference for a group of connected devices. The IRIG standard discloses a number of different carrier frequencies and time formats, all with distinct advantages and disadvantages depending on the particular application. Some typical uses of IRIG time synchronization are missile and spacecraft tracking systems, telemetry systems, and power distribution, control, and protection devices.

Generally, the different IRIG standard protocols are limited in bandwidth and functionality. For instance, IRIG-B has a total data rate of 100 bits per second, and the vast majority of the data passed is dedicated to time information. However, IRIG-B does allow for multiple user defined bits per data packet, which may be used by different connected devices for their own purposes. However, while the unused bits in an IRIG time stream could conceivably be used to stream GPS derived location information, or another form of slowly changing information, it has not yet been done.

One form of intelligent electronic device is the well known power protection relay. There are many other forms of intelligent electronic devices. Devices which measure and/or derive phasors are referred to as phasor measurement units (PMUs). PMUs may further be adapted to measure or derive synchronized phasors.

One known approach for measuring synchronized phasors involves using a protective relay. U.S. Pat. No. 6,662,124, assigned to Schweitzer Engineering Laboratories, describes a protective relay for electric power systems for system-wide control and analysis and for protection. This patent is incorporated by reference herein. The protective relay generally includes an acquisition circuit for obtaining voltage values and/or current values from a power line. A first sampling circuit therein samples the voltage and/or current values at selected intervals of time. A first calculation system uses the resulting samples to perform selected power system-wide control and analysis determinations. A frequency estimating circuit for determining the power system frequency, wherein a second sampling circuit resamples the sampled voltage and/or current values at a rate, which is related to the power system frequency. A second calculation system using the resampled voltage and current values performs selected protection functions for the portion of the power line associated with the protective relay.

U.S. Pat. No. 6,662,124 describes yet another protective relay for electric power systems using synchronized phasors for system-wide control and analysis and for power line protection. This second embodiment protective relay includes voltage and current acquisition circuits for obtaining voltage and current values from a power line. A sampling circuit is further provided for sampling the voltage and current values at selected intervals of time, wherein the sampling is based on an absolute time value reference. A first calculation system using the sampled signals performs selected power system-wide protection, control and analysis determinations and produces synchronized voltage and current phasor values from the acquired voltage and current values. The synchronized voltage and current values are substantially independent of system frequency for protection and control functions. A second calculation system is further provided being responsive to synchronized phasor values from the protective relay and from another relay which is remote from the protective relay on the same power line. Accordingly, U.S. Pat. No. 6,662,124 describes an example of a PMU being a protective relay.

Note that within the context of this application, streaming does not refer to the common definition known in the art; i.e.; the regulated transfer of data in a fashion that allows each transfer to be operated on by a receiving processing unit. Instead, within this application, streaming only refers to the process of decomposing a larger message into chunks small enough to be transmitted within a limited amount of free bits allowed by a carrier protocol. Further a stream, within this application, is used to refer to a continuous transmission of information, as opposed to the common definition known in the art.

OBJECTS OF THE INVENTION

Accordingly, it is an object of this invention to stream slowly changing information by utilizing the unused bits within an IRIG time stream.

Another object of this invention to utilize the unused bits within an IRIG time stream to pass GPS derived location information to other connected devices.

Another object of this invention is to utilize streamed location to accurately determine the location of a detected fault.

SUMMARY OF THE INVENTION

The disclosed invention achieves it objectives by embedding the information it wishes to transmit within a digital stream which has at least one user definable bit. In particular, an intelligent electronic device receives general information from a source. The information is processed and segmented by a processor within the intelligent electronic device. The processor then relays the segmented information to a serial stream information, along with information required for a digital stream published by the serial stream generator. The serial stream generator then embeds the transmitted chunk of information into the digital stream, and outputs the digital stream to other connected devices. In particular, an IRIG-B time stream can be used, and location information can be acquired from a GPS module and broken up into its component bits. Each bit is then passed one per frame within the IRIG-B time stream.

In an alternative embodiment, this invention can be implemented as a method operating within an intelligent electronic device for communicating general information within a digital stream. The intelligent electronic device first acquires information from a source. It then segments the information into smaller segments, which may be embedded into the digital stream. Finally, the information segments are embedded within the digital stream, and transmitted to other devices. One example of this methods use is to embed location information into an IRIG-B time stream.

In an additional alternative embodiment, this invention can be implemented as a method operating within an intelligent electronic device for determining the location of a fault in a monitored power distribution system. To accurately determine the location of a fault, the first intelligent electronic device must be networked to at least one additional intelligent electronic device. Specifically, the method operates by receiving local location information for the intelligent electronic device from, for instance, a GPS module. The intelligent electronic device then receives fault information, from one of the networked intelligent electronic devices. In addition, the intelligent electronic device receives location information from the fault reporting intelligent electronic device, and based on the received fault and location information, determines the location of the fault.

BRIEF DESCRIPTION OF THE DRAWINGS

Although the characteristic features of this invention will be particularly pointed out in the claims, the invention itself, and the manner in which it can be made and used, can be better understood by referring to the following description taken in connection with the accompanying drawings forming a part hereof, wherein like reference numerals refer to like parts throughout the several views and in which:

FIG. 4 is a detailed view of the contents of IRIG-B user defined bit 26 as it is used to stream an arbitrary message.

FIG. 6 is an illustration of another form of arbitrary information that can be streamed over IRIG.

DETAILED DESCRIPTION OF THE ILLUSTRATED EMBODIMENTS

Figure 1A:
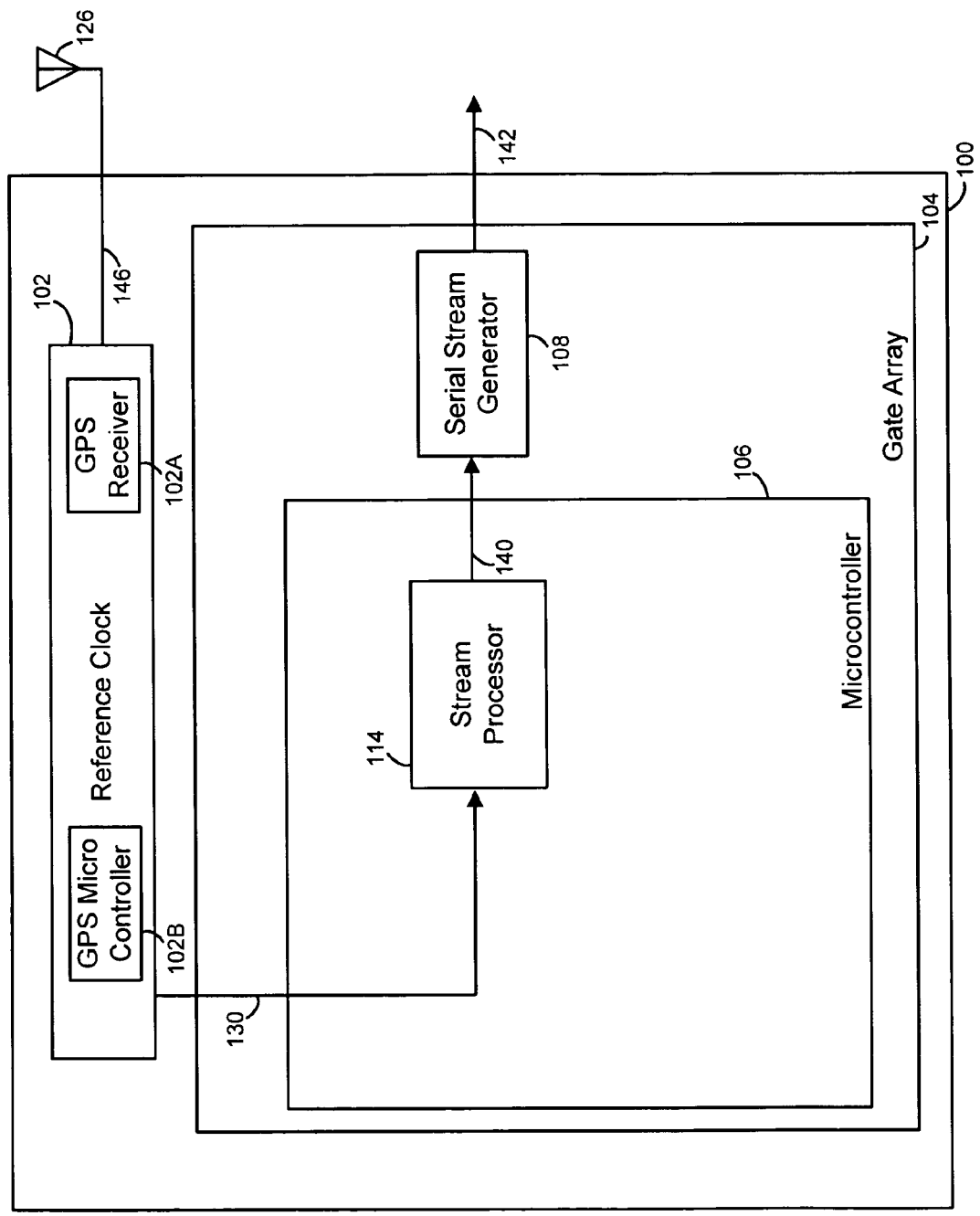
FIG. 1A is a block diagram of a time source device.

Referring to the Figures, and in particular to FIG. 1A, an intelligent electronic device (IED) with a built in GPS receiver is generally designated 100. The IED is shown coupled to an antenna 126, but the antenna could be incorporated into the IED 100 as well. The antenna 126 receives signals from GPS satellites (not shown), which are then processed by a GPS module 102. The GPS module 102 comprises a receiver 102A, which receives signals from the antenna and produces a signal usable by a GPS microcontroller 102B. The signals received from the GPS satellites consist of time codes from multiple satellites of known location. The GPS microcontroller 102B calculates location coordinates from the received GPS time codes using algorithms well known in the prior art.

The GPS microcontroller 102B is interfaced to the IED's 100 microcontroller 106 through any of the interfaces known in the art. As depicted, the microcontroller 106 is implemented within a gate array 104; however, it could just as easily be implemented as a discrete unit or using another method. Within the microcontroller 106, stream processor firmware 114 generates a serial stream 140. The serial stream 140 is then processed by a serial stream generator 108, which converts the serial stream into IRIG-B or some other time reference distribution stream. As shown, the serial stream generator 108 is also implemented within the gate array 104; however, it also could just as easily be implemented using one or more discrete components or another method. The IRIG-B serial stream 142 is then distributed to other connected devices (not shown). The microcontroller 106 receives GPS location information from the GPS module 102. The microcontroller 106 then causes the serial stream generator 108 to embed the GPS location information within the IRIG-B serial stream 142.

Figure 1B:
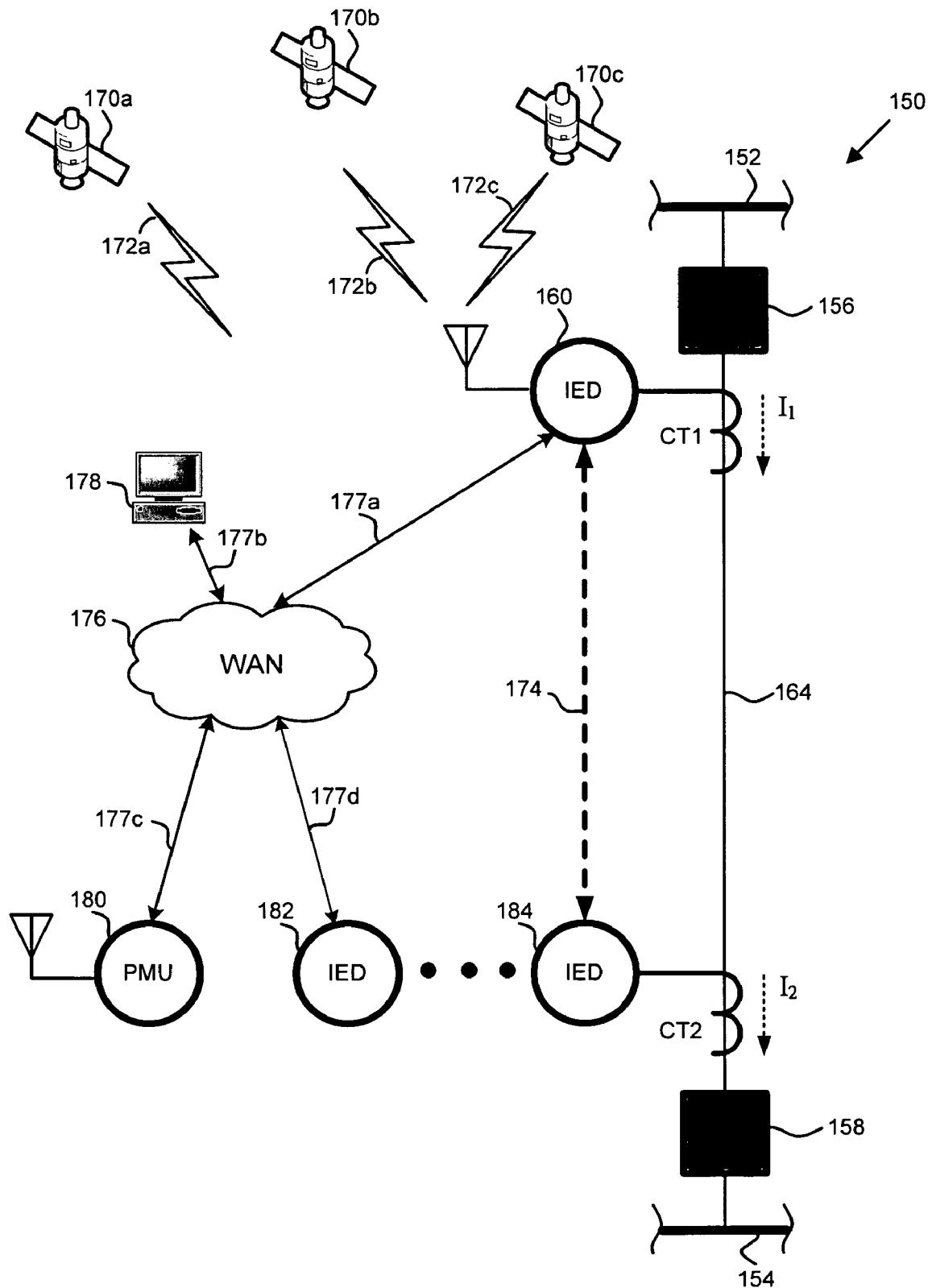
FIG. 1B is a diagrammatic view of a power protection system using streamed location information to determine the location of a detected fault.

FIG. 1B depicts a power protection system utilizing streamed location information to accurately determine the location of a detected fault. Three satellites, 170a-c are shown streaming GPS time codes to an intelligent electronic device 160. The intelligent electronic device 160 is shown monitoring a power line segment 164 defined by endpoints 152 and 154. Circuit breakers 156 and 158 may be activated by intelligent electronic devices 160 and 184 in the event a fault is detected in the power line segment 164. Intelligent electronic devices 160 and 184 are connected by a link 174, which could be fiber optic, cellular, microwave, coaxial copper cable, the monitored power conductor 164 itself or some other suitable link technology. In addition, intelligent electronic devices 160 and 184 are connected to other intelligent electronic devices 180 and 182 through a wide area network 176. Intelligent electronic devices may be connected directly to the wide area network 176, as illustrated by links 177a, 177c and 177d. Alternatively, intelligent electronic devices may be connected to the wide area network 176 through another intelligent electronic device, as illustrated by the connection between intelligent electronic devices 182 and 184. Finally, other devices, such as a computer 178 may be connected to the same wide area network 176 through any suitable link 177b technology. The computer 178 may be used to oversee the operation of the power protection network or to stream updated information to an intelligent electronic device coupled to the wide area network 176.

In operation, the intelligent electronic device 160 calculates its own location from received GPS information. It then operates normally until a fault is detected. When a fault is detected by intelligent electronic device 184, it notifies intelligent electronic device 160 of both the occurrence of the fault and the location of intelligent electronic device 184. Intelligent electronic devices 160 and 184 then operate to isolate the fault after determining it has occurred in power line segment 164. Finally, intelligent electronic device 160 calculates an approximate location for the location of the fault based on the locations of intelligent electronic devices 160 and 184, and the fault information using algorithms well known in the prior art.

Figure 2:
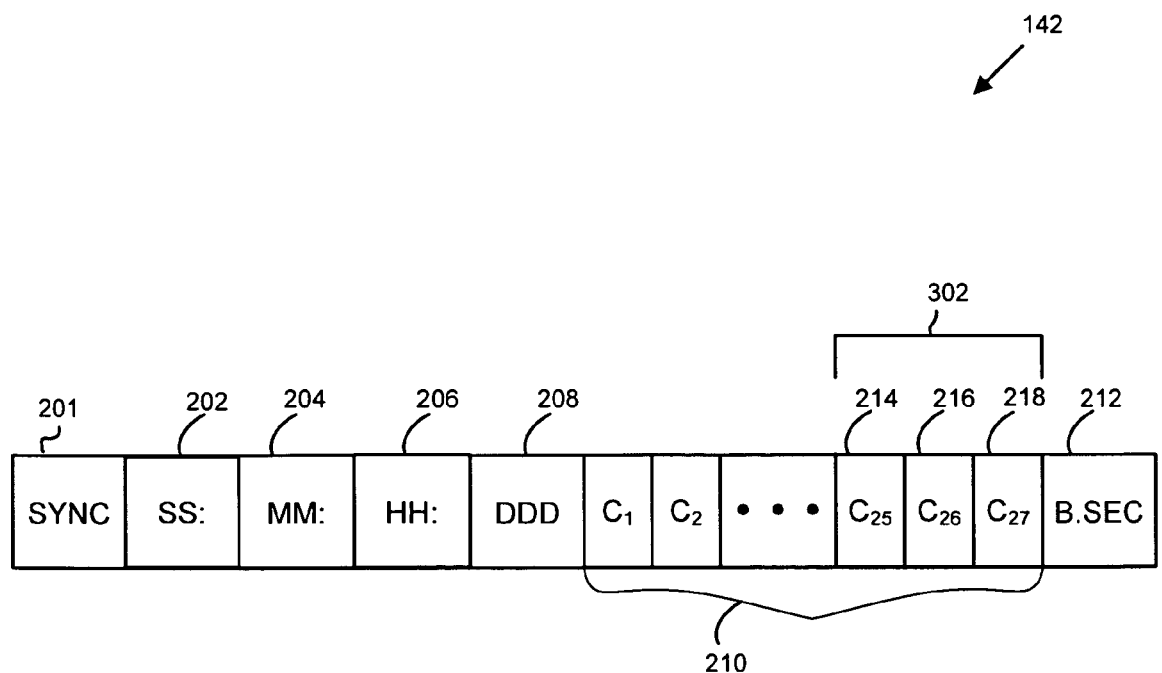
FIG. 2 is an illustration of the format of IRIG-B.

FIG. 2 depicts the IRIG-B standard serial stream. Without getting into the details of the IRIG standard, which can be found in IRIG Standard 200-04, each frame begins with a SYNC 201 bit, which is short for synchronization bit. Following the SYNC 201 bit is a seconds (SS) field 202, a minutes (MM) field 204, an hours (HH) field 206 and a day (DDD) field 208. The preceding time fields are encoded in binary coded decimal (BCD) format. In addition to the BCD time fields, each IRIG-B frame contains a seconds of day (B.SEC) field 212, which is binary encoded.

In addition to the time fields, there are a number of user definable bits 210 C1-C27. Three of the user definable bits, C25-C27 are not used by either IRIG or IEEE 1344, and are separately designated with identifier 302. In addition, each of the bits is shown with its own designator: C25 214, C26 216, and C27 218.

Figure 3:
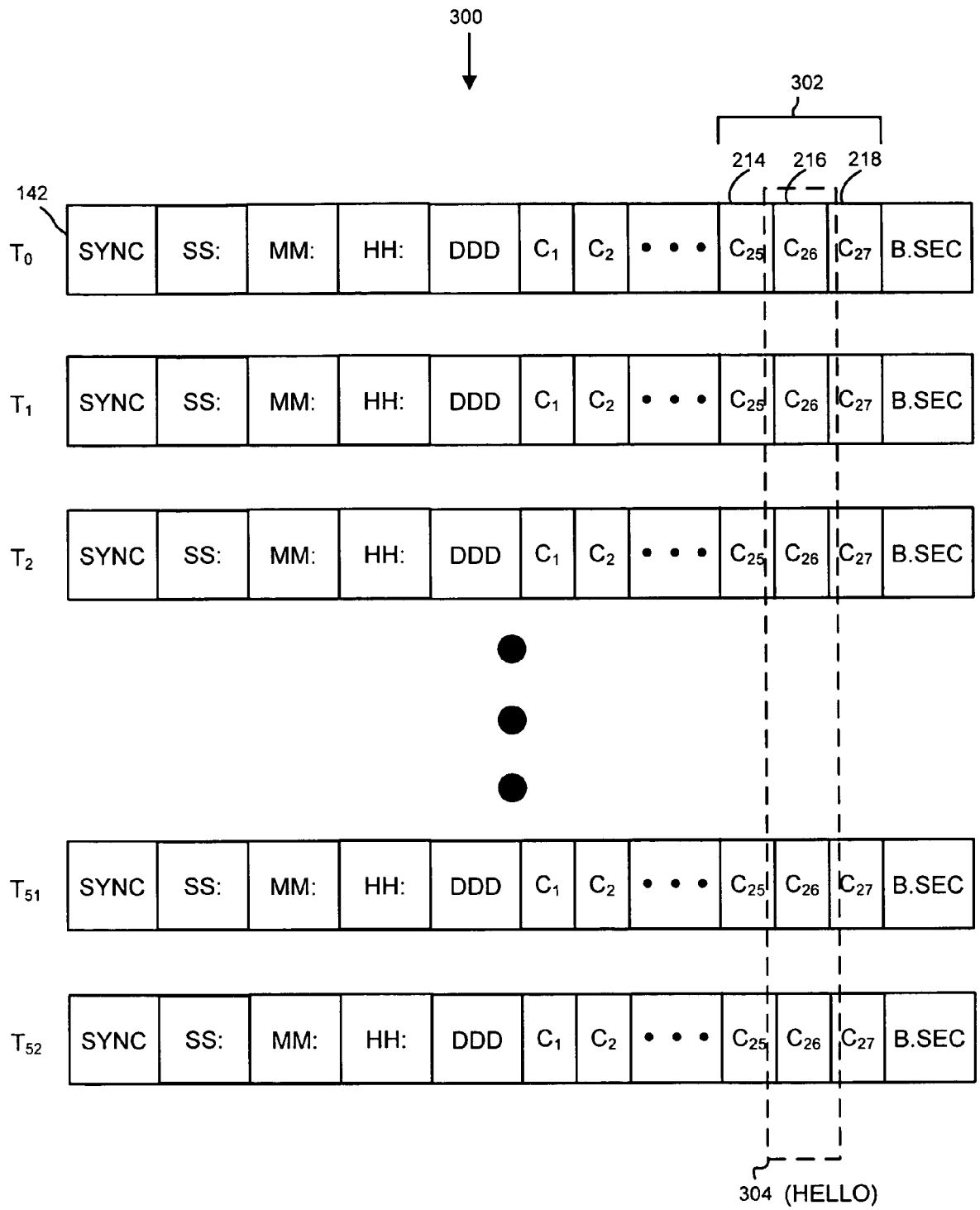
FIG. 3 is an illustration of one way to stream an arbitrary message using the user definable bits of IRIG-B.

The illustrated embodiment of the disclosed invention only uses control bit C26 216 for data, although all three bits could be used to provide faster updates. As depicted in FIG. 3, an arbitrary message can be streamed using the methods of the disclosed invention. While the methods of the disclosed invention are ideally suited to repetitively streaming a slowly changing message, this method could also be used to send single messages. However, if the methods of this invention were used to stream single messages, the use of error correction techniques well known in the prior art would be beneficial.

As illustrated, the contents of the 5 character word "HELLO" would be sent over a number of frames of IRIG-B. FIG. 4 shows in detail what C26 and the other user definable bits 302 may transmit in each frame to stream the word "HELLO." As illustrated, the entire word would be transmitted in 41 frames, assuming it was encoded as 8 bit ASCII, and that the first frame was not used to transmit any information. Further, in the illustrated embodiment, C25 was used as a frame bit always set "1," and C27 was used as a parity bit.

Figure 5A:
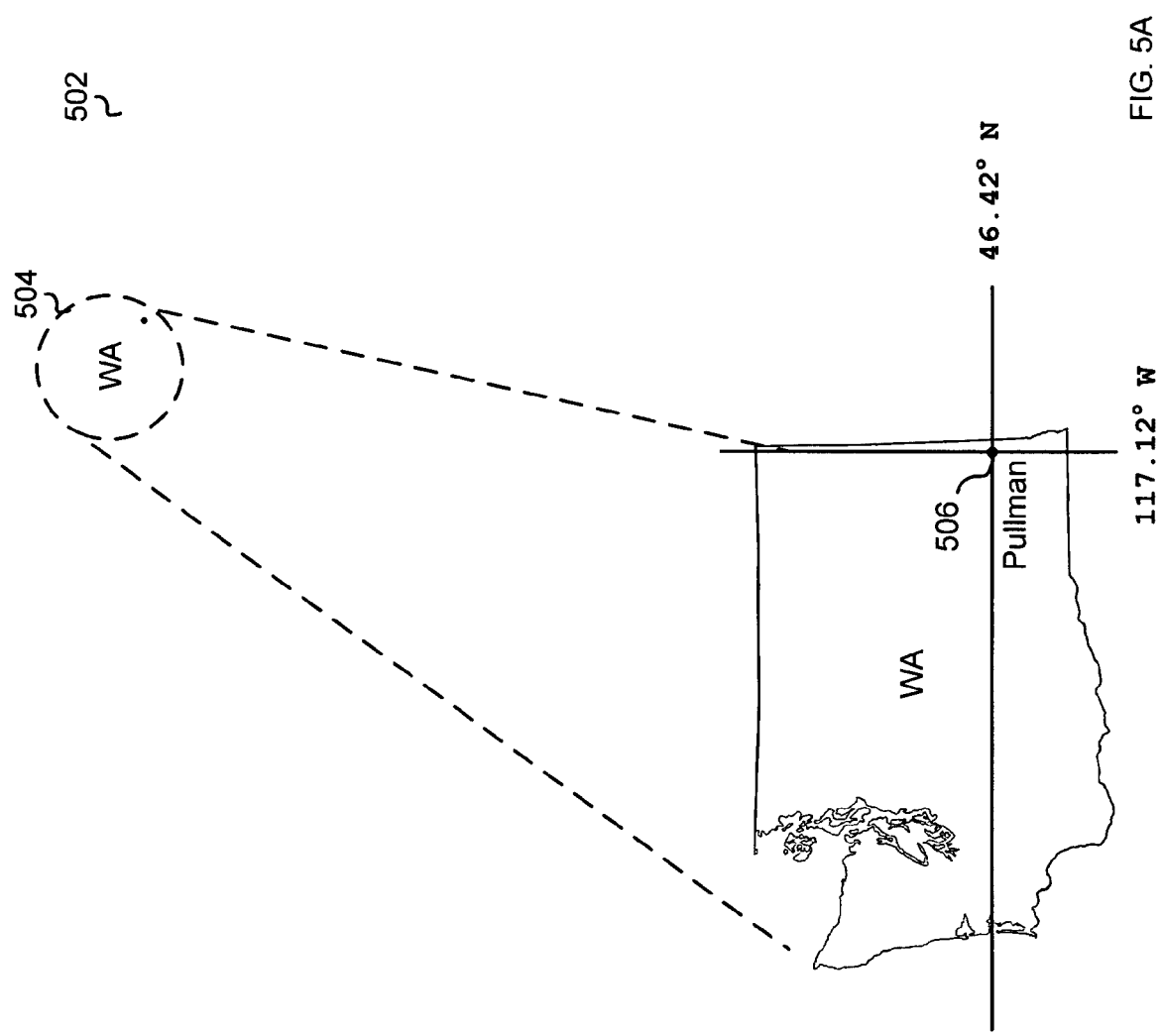
FIG. 5A is a map showing the latitude and longitude of Pullman, Wash.

The disclosed invention is well suited to stream GPS location information. Many devices obtain their reference time from a GPS source. Usually, the GPS source can derive its own location from GPS data it receives. GPS uses latitude/longitude information to encode locations. For instance, FIG. 5A shows the location of Pullman, Wash. as 46.42° N and 117.12° W.

Figure 5B:
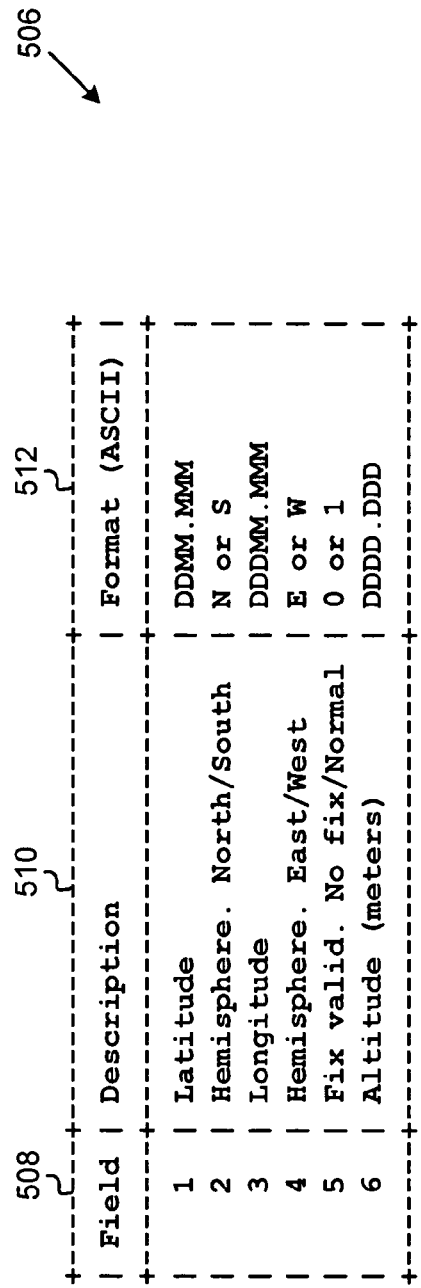
FIG. 5B is an illustration of a possible format for passing location information.
Figure 5C:
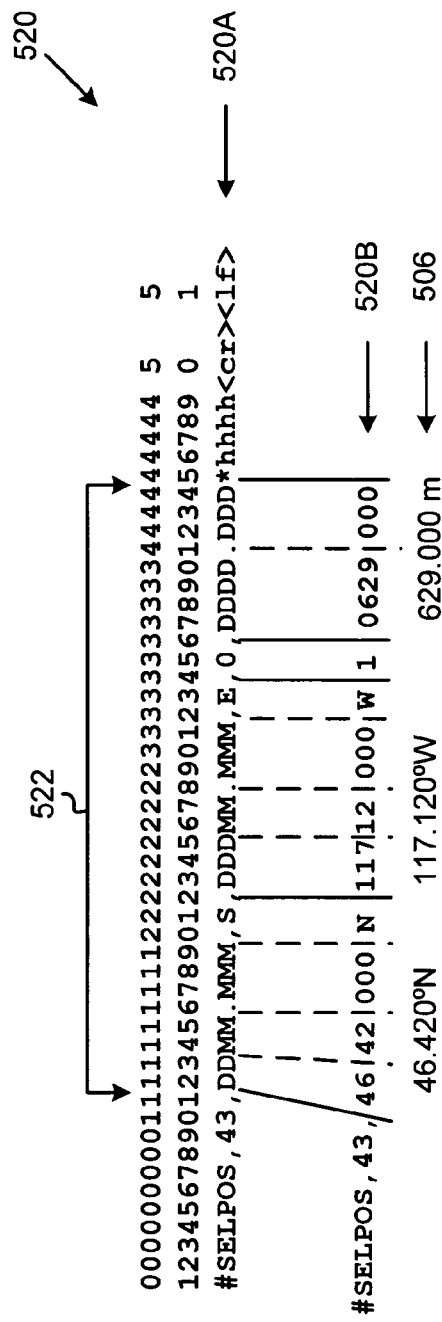
FIG. 5C is an illustration of a possible command sequence for passing the coordinates of Pullman, Wash. embedded within an IRIG-B stream.

FIG. 5B shows one possible way to format a stream of location information. As depicted, the stream would consist of six fields. These fields indicate the latitude, longitude, and altitude of the location in addition to indicating whether the location is in the north or south hemisphere or east or west hemisphere. The location of Pullman, Wash. would be encoded as shown in FIG. 5C, which is self-explanatory.

FIG. 6 is an illustration of an alternative type of information that could be streamed using the methods of this invention. Instead of GPS location information, FIG. 6 shows a password change streamed with the methods of this invention. The operation of streaming the password change would be identical to that of streaming GPS location information in other respects.

Figure 7:
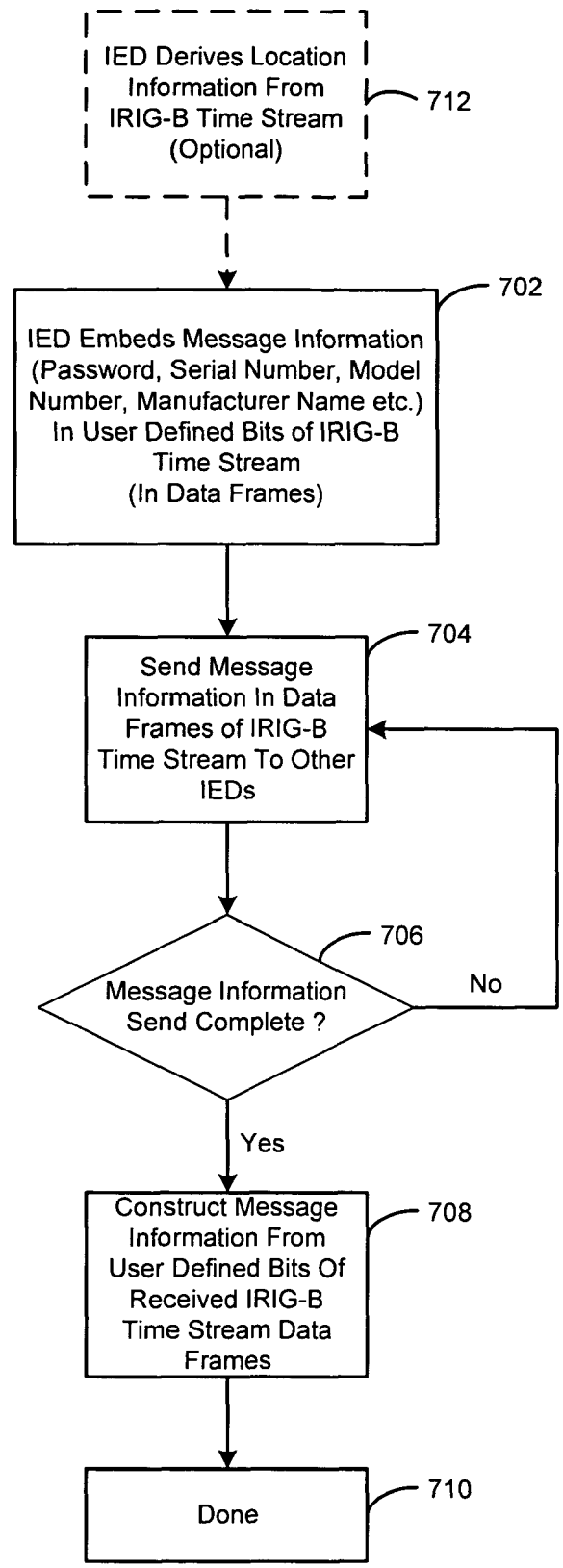
FIG. 7 is a flow chart illustrating how data is streamed over IRIG-B.

FIG. 7 is a flow chart of how an intelligent electronic device could stream generic information over an IRIG-B network. Beginning in step 712, location information is received over an IRIG-B network. The intelligent electronic device then uses one of the two remaining unused bits to embed additional information into the IRIG-B stream. This information could be password information, serial number information, model number information, manufacturer name information, functional parameter information, or virtually any other slowly changing or unchanging information. In steps 704 and 706, the intelligent electronic device continues to send the streamed information until the entire message is sent. Once the message is sent, the bit used to stream the information is no longer needed, and the same intelligent electronic device that was previously sending information may begin receiving information from another source in step 708 and completes in step 710.

Figure 8:
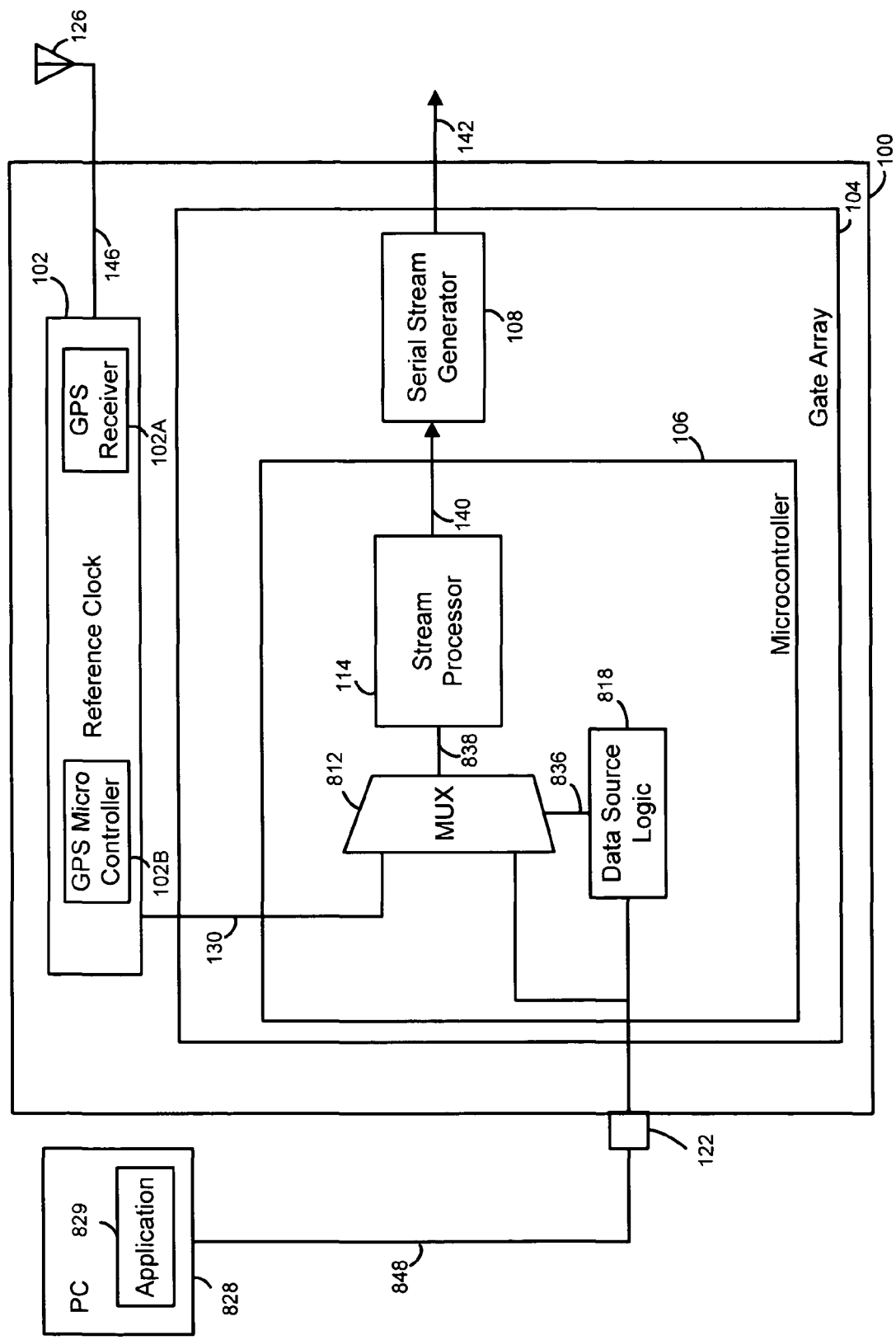
FIG. 8 is a block diagram of an alternative embodiment of the invention using a personal computer as an alternative time source.

FIG. 8 shows an alternative embodiment of the disclosed invention, where a personal computer 828 is used to control the embedded data stream through the port 122, which could be any low latency computer connection, such as universal serial bus (USB), IEEE 1394 or even RS232. The personal computer then generates data to embed in the time stream using application 829, and transmits it to IED 100. Data source selection logic 818, implemented as firmware within microcontroller 106, selects between the reference clock 102 and the port 122. The data source selection logic 818 could be controlled by the PC port 122, or it could be controlled by a jumper set on a PC board within the IED 100. The data source selection logic 818 generates a signal 836 which controls multiplexer 812. The multiplexer then outputs a selected data source 838 to stream processor 114. The data stream 140 is then output to the serial stream generator 108, which outputs a time stream in the manner already discussed.

Note that the invention described herein utilizes a digital processor. As the algorithms described do not require any particular processing characteristics, any type of processor will suffice. For instance, microprocessors, microcontrollers, digital signal processors, field programmable gate arrays, application specific integrated circuits (ASIC) and other devices capable of digital computations are acceptable where the term processor is used.

The foregoing description of the invention has been presented for purposes of illustration and description, and is not intended to be exhaustive or to limit the invention to the precise form disclosed. The description was selected to best explain the principles of the invention and practical application of these principles to enable others skilled in the art to best utilize the invention in various embodiments and various modifications as are suited to the particular use contemplated. It is intended that the scope of the invention not be limited by the specification, but be defined by the claims set forth below.

I claim:

1. An intelligent electronic device comprising:
   i) an antenna;
   ii) a GPS module coupled to the antenna and receiving signals from the antenna and further capable of processing the signals and outputting a time reference and a location corresponding to the physical location of the GPS module;
   iii) a processor coupled to the GPS module and executing instructions for processing the time reference and location and outputting a processed time referenced and a processed location;
   iv) a serial stream generator coupled to the processor and receiving the processed time reference and the processed location and further outputting a serial stream containing both the processed time reference and the processed location to another intelligent electronic device, the serial stream generator further configured to output an IRIG-B serial stream having a plurality of user definable bits; and wherein the serial stream generator is further configured to output, using at least one of the user definable bits of the IRIG-B stream, the processed location over a series of IRIG-B frames.

2. The intelligent electronic device of claim 1, wherein the serial stream generator is implemented within the processor.

3. The intelligent electronic device of claim 1, wherein the serial stream is an IRIG serial stream.

4. The intelligent electronic device of claim 1, wherein the stream generator is configured to output is an IRIG-B stream constrained by IEEE1344 or IEEEC37.118 having a plurality of unused bits, and the intelligent electronic device inserts at least a portion of the processed location information into at least one of the unused bits of said IRIG-B stream to transmit the processed location over a series of IRIG-B frames.

5. The intelligent electronic device of claim 1, wherein the processor is implemented within a gate array.

6. The intelligent electronic device of claim 5, wherein the serial stream generator is implemented within the gate array.

* * * * *